United States Patent
Sato (10) Patent No.: US 8,049,596 B2
(45) Date of Patent: Nov. 1, 2011

(54) CORRELATION-BASED BIOMETRIC AUTHENTICATION APPARATUS, AUTHENTICATION METHOD AND PROGRAM

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1119 days.

(21) Appl. No.: 11/835,667

(22) Filed: Aug. 8, 2007

(65) Prior Publication Data

US 2008/0040616 A1 Feb. 14, 2008

(30) Foreign Application Priority Data

Aug. 14, 2006 (JP) ................. 2006-221120

(51) Int. Cl.
*G05B 19/00* (2006.01)
*G06K 9/00* (2006.01)
*H04N 5/225* (2006.01)
*H04N 5/14* (2006.01)

(52) U.S. Cl. ....... 340/5.82; 382/172; 382/115; 348/699; 348/207.99

(58) Field of Classification Search ................. None
See application file for complete search history.

(56) References Cited

U.S. PATENT DOCUMENTS

| | | | |
|---|---|---|---|
| 5,737,439 A | 4/1998 | Lapsley et al. | |
| 5,905,527 A * | 5/1999 | Inou et al. | 348/207.99 |
| 6,922,478 B1 | 7/2005 | Konen et al. | |
| 7,450,757 B2 * | 11/2008 | Kato et al. | 382/172 |
| 7,835,546 B2 * | 11/2010 | Abe | 382/115 |
| 2006/0244866 A1 * | 11/2006 | Kishida | 348/699 |

FOREIGN PATENT DOCUMENTS

| | | |
|---|---|---|
| DE | 198 10 792 A1 | 9/1999 |
| JP | 2006-099718 | 4/2006 |

* cited by examiner

*Primary Examiner* — George Bugg
*Assistant Examiner* — Renee Dorsey
(74) *Attorney, Agent, or Firm* — Finnegan, Henderson, Farabow, Garrett & Dunner, L.L.P.

(57) ABSTRACT

An authentication apparatus includes: image processing means for performing predetermined image processes on biometric trait image data sequentially supplied from image pickup means at predetermined intervals, the predetermined image processes including at least a binarization process; detection means for detecting, over time, correlation values between adjoining images of the image data on a time axis and correlation values between adjoining binarized images of binarized image data on a time axis; and selection means for selecting, when a situation in which both the correlation values of the images and the correlation values of the binarized images are respectively less than a first threshold and a second threshold continues over a predetermined period of time, one of the binarized image data input after the continuation of the situation, to be compared with registration data.

5 Claims, 5 Drawing Sheets

CORRELATION-BASED BIOMETRIC AUTHENTICATION APPARATUS, AUTHENTICATION METHOD AND PROGRAM

CROSS REFERENCES TO RELATED APPLICATIONS

The present invention contains subject matter related to Japanese Patent Application JP2006-221120 filed in the Japanese Patent Office on Aug. 14, 2006, the entire contents of which being incorporated herein by reference.

BACKGROUND OF THE INVENTION

1. Field of the Invention

The present invention relates to an authentication apparatus, authentication method and program thereof, and is preferably applied to a biometric authentication system, for example.

2. Description of Related Art

In recent years, biometric authentication is often performed based on blood vessels. An authentication apparatus extracts an image of blood vessels from a person's finger and then compares the extracted image of blood vessels with registered templates. If its matching result, or correlation value, is greater or equal to a predetermined threshold, the authentication apparatus determines that the person is legitimate.

If the finger moves or trembles while the authentication apparatus is taking moving images of the blood vessels for verification, the acquired images present continually-changing blood vessels patterns. In this case, the authentication apparatus performs a correction process for the acquired images (see Jpn. Pat. Laid-open Publication No. 2006-099718, for example).

SUMMARY OF THE INVENTION

However, taking the moving images of the blood vessels for verification increases the number of images input into the authentication apparatus, compared to a system, for example, which uses only one picture of fingerprints. If an identity thief inputs random data that approximately correspond to the registered moving images, he/she may be identified as a legitimate person.

The present invention has been made in view of the above points and is intended to provide an authentication apparatus, authentication method and program thereof that can prevent identity theft.

In one aspect of the present invention, an authentication apparatus includes: image processing means for performing predetermined image processes on biometric trait image data sequentially supplied from image pickup means at predetermined intervals, the predetermined image processes including at least a binarization process; detection means for detecting, over time, correlation values between adjoining images of the image data on a time axis and correlation values between adjoining binarized images of binarized image data on a time axis; and selection means for selecting, when a situation in which both the correlation values of the images and the correlation values of the binarized images are respectively less than a first threshold and a second threshold continues over a predetermined period of time, one of the binarized image data input after the continuation of the situation, to be compared with registration data.

Accordingly, if an identity thief or someone inputs inappropriate data, such as random data whose patterns are similar to that of the registration data, or if the intensity of the light emitted to the biometric traits is unstable, then one or both of the correlation values of the original and binarized images exceed the thresholds. This prevents the authentication apparatus from comparing those inappropriate data with the registration data. In addition, that maintains the precision of the authentication by eliminating the effect of random noise.

In this manner, that can prevent the authentication apparatus from comparing those inappropriate data with the registration data. In addition, that maintains the precision of the authentication by eliminating the effect of random noise. Thus, the authentication apparatus, the authentication method and the program thereof can prevent identity theft.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Overall Configuration of an Authentication Apparatus

Figure 1:
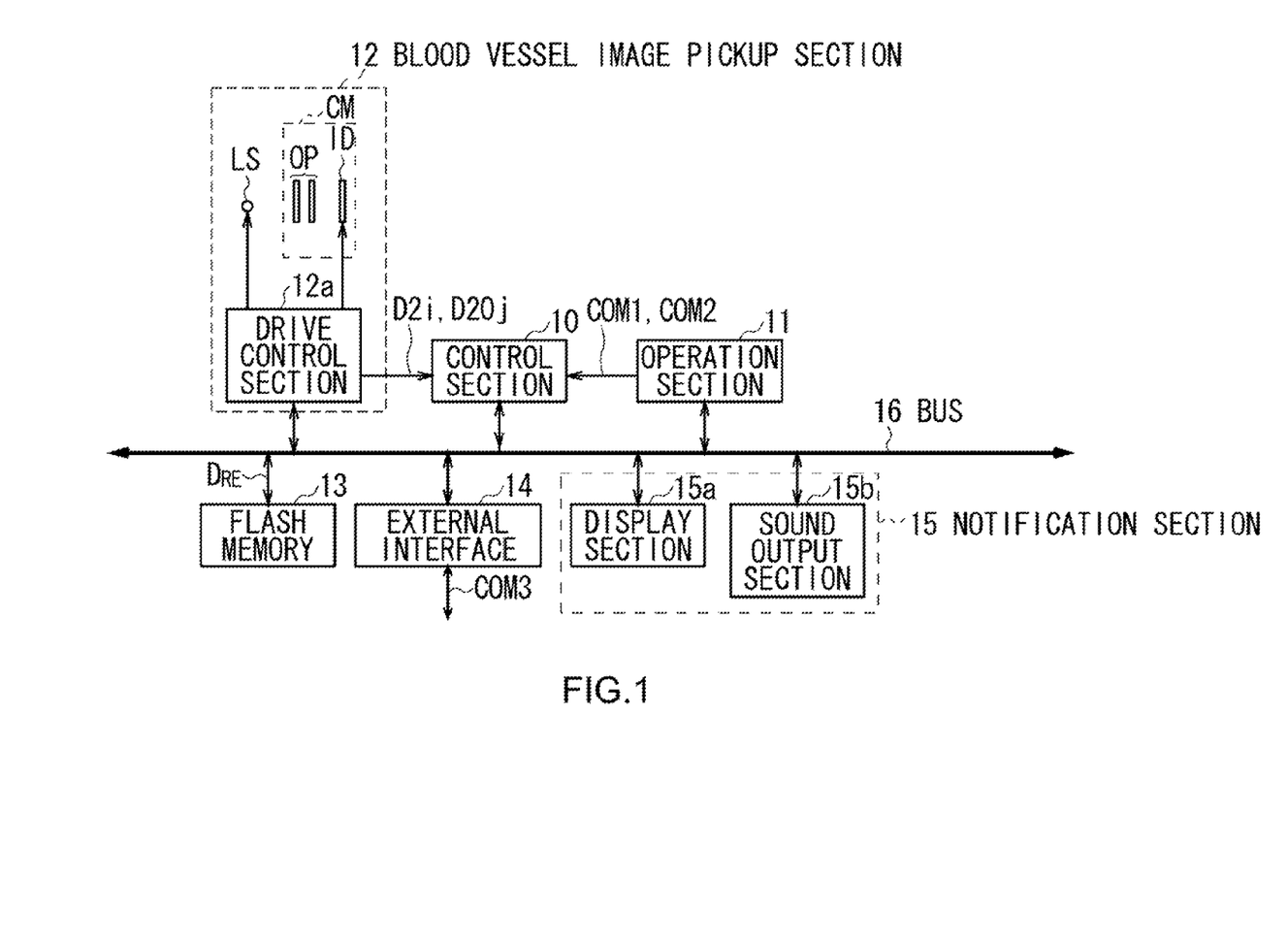
FIG. 1 is a block diagram illustrating the overall configuration of an authentication apparatus according to an embodiment of the present invention.

FIG. 1 illustrates the overall configuration of an authentication apparatus 1 according to an embodiment of the present invention. The authentication apparatus 1 includes a control section 10 to which an operation section 11, a blood vessel image pickup section 12, a flash memory 13, an interface 14 (also referred to as an "external interface") for exchanging data with external devices, and a notification section 15 are connected via a bus 16.

The control section 10 is a micro computer including a Central Processing Unit (CPU), which takes overall control of the authentication apparatus 1, a Read Only Memory (ROM), in which various programs and setting information are stored, and a Random Access Memory (RAM), which serves as a work memory for the CPU.

When a user operates the operation section 11, the operation section 11 may supply an execution command COM1 or COM2 to the control section 10: the execution command COM1 orders the control section 10 to operate in a blood vessel enrollment mode in which the images of the blood vessels of the user (or registrant) are stored in the system while the execution command COM2 orders the control section 10 to operate in an authentication mode in which the identity of the registrant is verified.

The control section 10 selects, based on the supplied execution command COM1 or COM2, one of the modes and then executes an appropriate program. This program helps the control section 10 to control the blood vessel image pickup section 12, the flash memory 13, the external interface 14 and the notification section 15 in order to operate in the blood vessel enrollment mode or the authentication mode.

(1-1) Blood Vessel Enrollment Mode

After the blood vessel enrollment mode is selected, the control section 10 operates in the blood vessel enrollment mode and then controls the blood vessel image pickup section 12.

A drive control section 12a of the blood vessel image pickup section 12 controls the following elements: one or more near-infrared light sources LS, which emits near-infrared light toward a predetermined position of the authentication apparatus 1; and an image pickup element ID of an image pickup camera CM, such as a Charge Coupled Device (CCD).

When the user's finger is placed at that predetermined position, the near-infrared light, emitted from the near-infrared light sources LS, gets into the finger. After being reflected and scattered inside the finger, the near-infrared light therefore represents the image of the blood vessels of the finger and reaches, as a blood vessel representation beam, the image pickup element ID via an optical component system OP. The image pickup element ID photo-electrically converts the blood vessel representation light into image signals at a predetermined interval, which is then supplied to the drive control section 12a.

In reality, part of the near-infrared light is reflected on the finger's surface and is received by the image pickup element ID. Accordingly, the image or the image signals output from the image pickup element ID may represent not only the blood vessels inside the finger but the outline of the finger, the fingerprints and the like.

The drive control section 12a adjusts, based on the pixel values of that image, the position of an optical lens of the optical component system OP to focus on the blood vessels inside the finger. In addition, the drive control section 12a adjusts the exposure time of the image pickup element ID such that the image pickup element ID receives an appropriate amount of the light. After those adjustments, the drive control section 12a supplies the image data D2i (i=1, 2, ..., N (N: an integer)) from the image pickup element ID to the control section 10.

The control section 10 sequentially performs an outline extraction process, a smoothing process, a binarization process and a line-thinning process on the image data D2i, and then stores one or two of the resulting blood vessel images in the flash memory 13 as registration data $D_{RE}$.

In that manner, the control section 10 operates in the blood vessel enrollment mode.

(1-2) Authentication Mode

After the authentication mode is selected, the control section 10 operates in the authentication mode and then controls the blood vessel image pickup section 12 in a similar way to the above blood vessel enrollment mode.

In this case, the blood vessel image pickup section 12 controls the near-infrared light sources LS and the image pickup element ID. The blood vessel image pickup section 12 adjusts, in accordance with the image signals from the image pickup element ID, the position of the optical lens of the optical component system OP and the exposure time of the image pickup element ID. After those adjustments, the blood vessel image pickup section 12 supplies the image data D20j (j=1, 2, ..., n (n: an integer)) from the image pickup element ID to the control section 10.

The control section 10 performs a predetermined authentication process using the image data D20j and the registration data $D_{RE}$ stored in the flash memory 13 to check if a current user, who now puts his/her finger on the apparatus, is legitimate.

When the current user is verified as a legitimate registrant the control section 10 generates a predetermined execution command COM3 and then supplies this command COM3 via the external interface 14 to a certain operation apparatus (not shown), which then performs a predetermined process.

For example, the operation apparatus, connected via the external interface 14, may be a locking device for a door: The execution command COM3 from the control section 10 orders the operation apparatus to unlock the door. Alternatively, the operation apparatus may be a computer that operates in a plurality of operation modes, one or some of which are restricted: The execution command COM3 from the control section 10 orders the operation apparatus to lift the restriction.

The operation apparatus may be designed in different ways. Instead of being connected via the external interface 14, the software and hardware components of the operation apparatus may be incorporated in the authentication apparatus 1.

Whereas when the current user is not verified as a legitimate registrant, the control section 10 displays information to that effect on a display section 15a of the notification section 15 and outputs sound through a sound output section 15b of the notification section 15. In this manner, the authentication apparatus 1 auditorily and visually informs that the current user is not legitimate.

In this manner, the control section 10 operates in the authentication mode.

(2) Detailed Description of the Authentication Process

Figure 2:
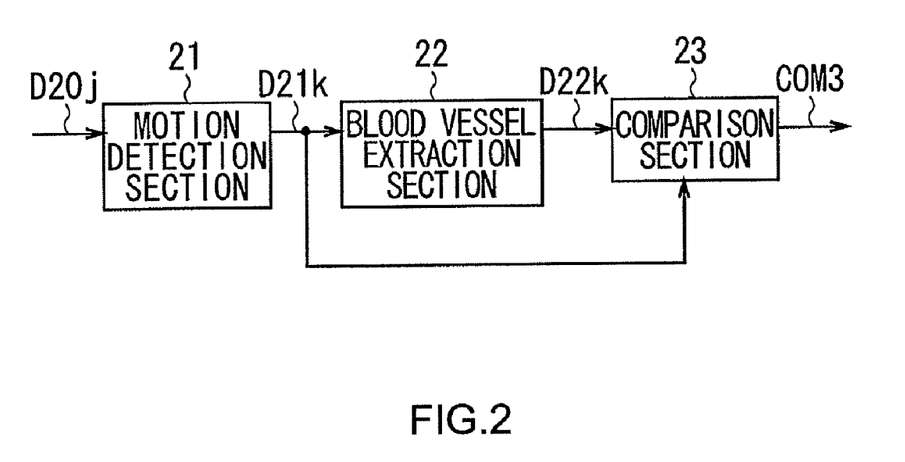
FIG. 2 is a block diagram illustrating the functional configuration of an authentication process.

The authentication process, performed by the control section 10 in the authentication mode, will be described in detail. As shown in FIG. 2, the functional components of the authentication process include a motion detection section 21, a blood vessel extraction section 22 and a comparison section 23. The motion detection section 21, the blood vessel extraction section 22 and the comparison section 23 will be described.

(2-1) Motion Detection

The motion detection section 21 receives the image data D20j or a plurality of images, which are sequentially supplied from the image pickup element ID (FIG. 1) at a predetermined interval. As for those images of the image data D20j, the motion detection section 21 calculates a correlation value between the current image and the previous image and then checks if the calculated correlation value is greater or equal to a predetermined first threshold.

When the calculated correlation value is greater or equal to the first threshold it means that the finger on the authentication apparatus 1 is substantially in a stationary state. In this case, the motion detection section 21 continues processes.

On the other hand, when the calculated correlation value is less than the first threshold, it means that the finger on the authentication apparatus 1 is moving. In this case, the motion detection section 21 deletes the current image of the image data D20j if the situation in which the calculated correlation value is less than the first threshold does not continue more than a predetermined period of time. After that, the motion detection section 21 continues processes.

In that manner, the motion detection section 21 selects, out of the images of the image data D20$j$, the images of the image data D21$k$ ($k$=1, 2, ... m (m: an integer)) representing the finger in a stationary state, and then supplies them to the subsequent sections.

(2-2) Blood Vessel Extraction Process

The blood vessel extraction section 22 processes the image data D21$k$, supplied from the motion detection section 21, by performing the following processes: a predetermined outline extraction process, such as Sobel filtering; a predetermined smoothing process, such as Gaussian filtering; a binarization process; and a line-thinning process (Similarly, the above blood vessel enrollment mode performs those processes). The blood vessel extraction section 22 then supplies resulting binarized image data D22$k$ to the comparison section 23.

(2-3) Comparison Process

The comparison section 23 checks the correlation values of the image data D21$k$ supplied from the motion detection section 21 and the correlation values of the binarized image data D22$k$ supplied from the blood vessel extraction section 22: The correlation values between the current and previous images change as time advances because the image data D21$k$ and D22$k$ are a stream of images. If the fluctuations of those correlation values have been substantially stabilized for more than a predetermined period, the comparison section 23 starts a comparison process to compare them with the registration data $D_{RE}$ (FIG. 1).

Figure 3:
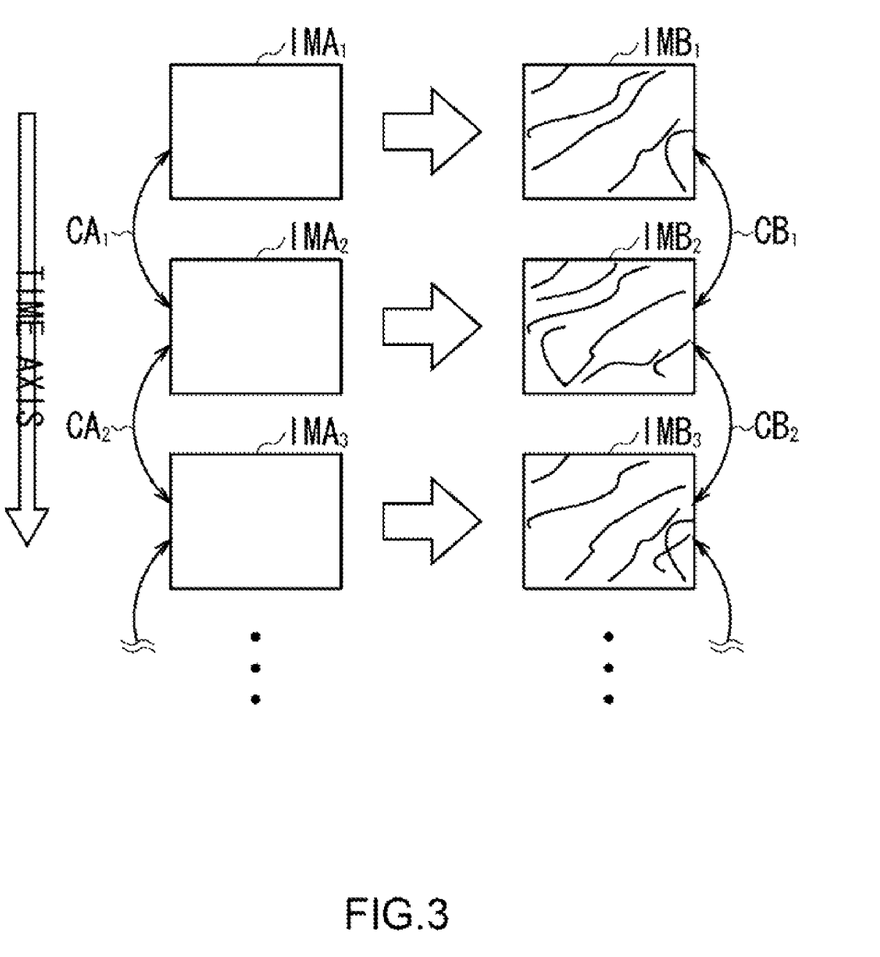
FIG. 3 is a schematic diagram illustrating a method of detecting correlation values over time.

In reality, as shown in FIG. 3, the comparison section 23, for example, sequentially detects the correlation value $CA_1$ between a multilevel image $IMA_2$ and the previous multilevel image $IMA_1$, the correlation value $CA_2$ between a multilevel image $IMA_3$ and the previous multilevel image $IMA_2$ and so on (Those correlation values are also referred to as "multilevel image correlation values"). The comparison section 23 then compares the current multilevel image correlation value with the previous multilevel image correlation value.

Similarly, the comparison section 23 sequentially detects the correlation value $CB_1$ between a binarized image $IMB_2$ and the previous binarized image $IMB_1$, the correlation value $CB_2$ between a binarized image $IMB_3$ and the previous binarized image $IMB_2$ and so on (Those correlation values are also referred to as "binarized image correlation values"). The comparison section 23 then compares the current binarized image correlation value with the previous binarized image correlation value.

The comparison section 23 subsequently checks if the result of comparing the current multilevel image correlation value with the previous multilevel image correlation value is less than the first threshold, and also checks if the result of comparing the current binarized image correlation value with the previous binarized image correlation value is less than a second threshold.

If one or both of the results are greater or equal to the thresholds, then this means that an identity thief or someone inputs random pattern data or low autocorrelation data whose patterns are similar to the blood vessel patterns of the registration data $D_{RE}$ (FIG. 1), or that the input data are less appropriate for being compared with the registration data $D_{RE}$ (FIG. 1) due to the unstable light emitted to the finger. In this case, the comparison section 23 continues this comparison process without performing the comparison with the registration data $D_{RE}$ (FIG. 1).

On the other hand, if both of the results are less than the thresholds, the comparison section 23 starts counting the period of time during which both of the results are less than the thresholds.

The comparison section 23 stops the counting of the period when one or both of the results (the comparison results of the current and previous multilevel image correlation values and the current and previous binarized image correlation values) become greater or equal to the thresholds. After that, the comparison section 23 re-starts the counting of the period when both of the results become less than the thresholds again.

When the counted period of time becomes more than a predetermined period of time the comparison section 23 starts comparing the currently-detected binarized image with the registration data $D_{RE}$ (FIG. 1). If the blood vessel pattern of the binarized image matches that of the registration data $D_{RE}$ to a certain degree, the comparison section 23 supplies the execution command COM3 to the operation apparatus (not shown), which then performs a predetermined process.

Figure 4:
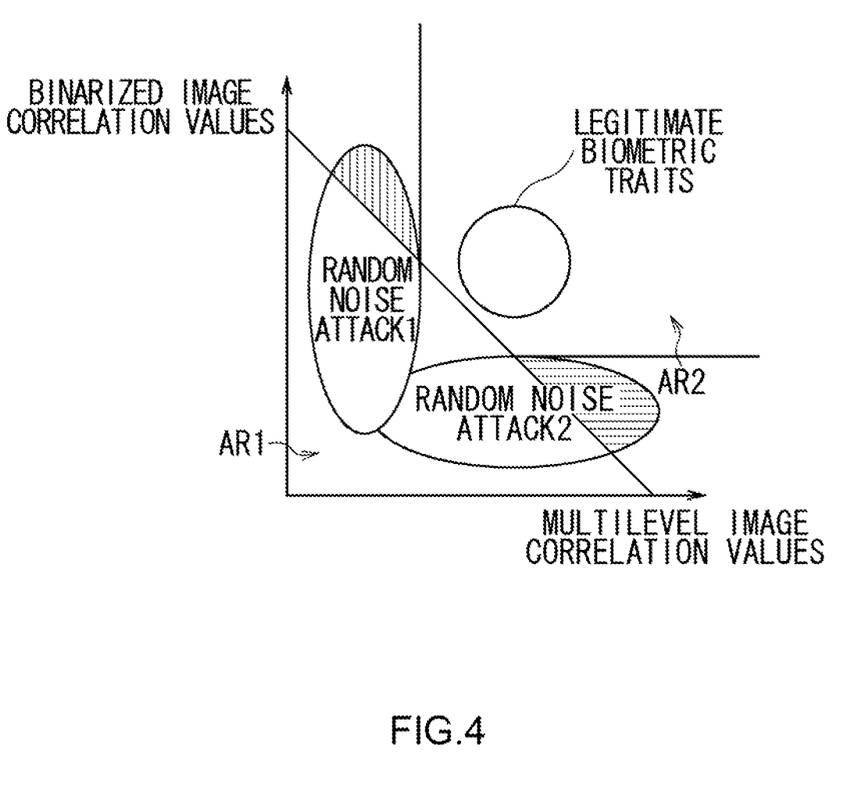
FIG. 4 is a schematic diagram illustrating an authentication OK area.

In that manner, the control section 10 does not allow the inappropriate data (such as the data highly correlated with the multilevel image but not with the binarized image or the data highly correlated with the binarized image but not with multilevel image, as indicated by dotted lines in FIG. 4) to be compared with the registration data $D_{RE}$, based on the result of detecting the correlations of the adjoining images on a time axis over time (such as the multilevel images (or the image data D21$k$) and the binarized images (or the binarized image data D22$k$)).

Accordingly, the control section 10 ensures an authentication OK area AR2, which is more strict than an authentication OK area AR1 in which the inappropriate data are not filtered. That can prevent identity theft.

(3) Authentication Process

Figure 5:
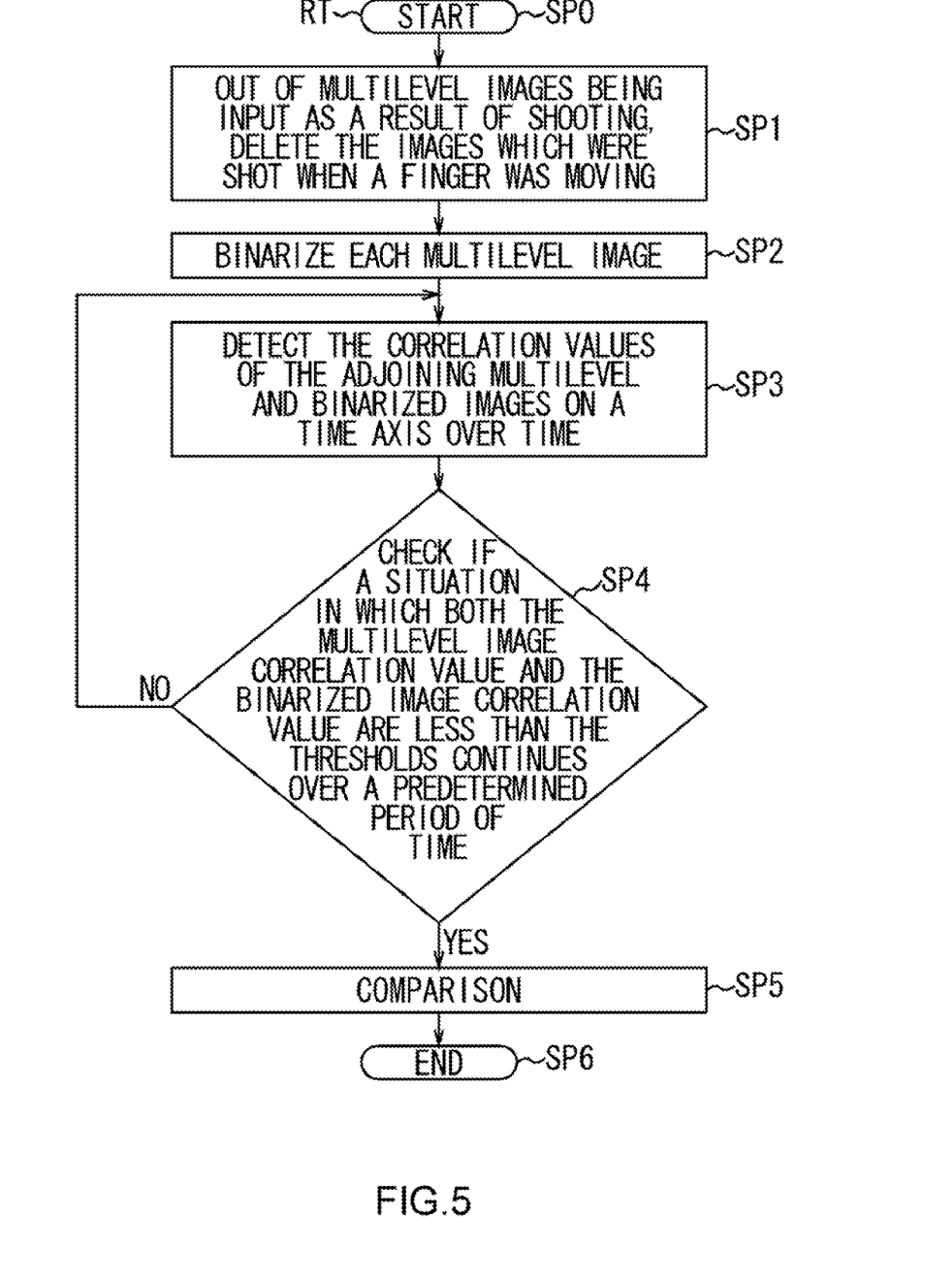
FIG. 5 is a flowchart illustrating a procedure of the authentication process.

FIG. 5 is a flowchart illustrating the above authentication process. The control section 10 starts a procedure RT of the authentication process from step SP0 when the authentication mode's execution command COM2 is supplied from the operation section 11 (FIG. 1). The control section 10 then, at step SP1, starts controlling the blood vessel image pickup section 12 and then deletes, out of the images of the image data D20$j$ (FIG. 2) sequentially supplied from the image pickup element ID (FIG. 1) of the blood vessel image pickup section 12, the images in which the finger is moving.

After deleting those images, the control section 10 at step SP2 performs the predetermined image processes on the image data D21$k$ (FIG. 2) to produce the binarized image data D22$k$.

At step SP3, the control section 10 starts detecting, as for the image data D21$k$, the multilevel image correlation values of the adjoining multilevel images on a time axis over time, and also starts detecting, as for the binarized image data D22$k$ (FIG. 2), the binarized image correlation values of the adjoining binarized images on a time axis over time.

At step SP4, the control section 10 checks if the period of time during which both the multilevel image correlation value and the binarized image correlation value are less than the thresholds become more than the predetermined period of time. If that period become more than the predetermined period, the control section 10 proceeds to step SP5. At step SP5, the control section 10 selects current or subsequent one out of the images of the binarized image data D22$k$ to compare it with the registration data $D_{RE}$ (FIG. 1), and then proceeds to step SP6 to end the procedure RT.

In that manner, the control section 10 performs the authentication process, based on the procedure RT.

(4) Operation and Effect

The authentication apparatus 1 with the above configuration takes images of the finger's blood vessels as the image data D21$k$ (FIG. 2) and checks the multilevel image correlation values of the adjoining images on a time axis over time. In addition, the authentication apparatus 1 performs predetermined image processes, such as an outline extraction process, a smoothing process, a binarization process and a line-thinning process, on the image data D20$j$ to produce the binarized image data D22$k$ (FIG. 2) and checks the binarized image correlation values of the adjoining binarized images on a time axis over time (FIG. 3).

When the situation in which the multilevel image correlation value and the binarized image correlation value are respectively less than the first and second thresholds continues over a predetermined period of time, the authentication apparatus 1 then selects, out of the images of the binarized image data, current or subsequent one to be compared with the registration data $D_{RE}$ (FIG. 1).

If an identity thief or someone inputs inappropriate data, such as random data whose patterns are similar to that of the registration data, or if the intensity of the light emitted to the biometric traits (or the finger) is unstable, then one or both of the correlation values of the multilevel and binarized images exceed the thresholds (as shown in FIG. 4). This prevents the authentication apparatus 1 from comparing those inappropriate data with the registration data. In addition, that maintains the precision of the authentication by eliminating the effect of random noise.

In this embodiment, before detecting the multilevel image correlation values, the authentication apparatus 1 deletes, out of the images of the image data D20$j$ (FIG. 2) sequentially supplied from the image pickup element ID (FIG. 1) at predetermined intervals, an image whose correlation value with the previous image is greater or equal to a third threshold.

Accordingly, if the finger is moving or if an identity thief or someone inputs inappropriate random data whose patterns are similar to that of the registration data, the correlation values between the current and previous images become greater or equal to the thresholds, and therefore the authentication apparatus 1 deletes that image. In this manner, the authentication apparatus 1 can detect both the images in which the finger is substantially in a stationary state and the data that an identity thief or someone inappropriately inputs (although the number of inappropriate data patterns detected by the apparatus may decrease compared to the one that takes into consideration the binarized image correlation values). That maintains the precision of the authentication by eliminating the effect of random noise.

(5) Other Embodiment

In the above-noted embodiments, the blood vessel is used as a biometric trait for authentication. However, the present invention is not limited to this. Alternatively, finger print or mouth patterns may be applied. In the above-noted embodiment, the finger is used as a biometric trait. However, the present invention is not limited to this. Alternatively, palms, toes, limbs, eyes or the like may be applied.

Moreover, in the above-noted embodiments, the control section 10 executes the programs stored in the ROM to perform the motion detection process, the blood vessel extraction process and the comparison process. However, the present invention is not limited to this. Instead of the software, the control section 10 may be equipped with specialized hardware to perform those processes.

Furthermore, in the above-noted embodiment, the image pickup function, the comparison function and the enrollment function are all incorporated into the authentication apparatus 1. However, the present invention is not limited to this. Those functions may be separately incorporated into different devices.

The method according to an embodiment of the present invention can be applied in the field of image processing, especially in the field of biometric authentication.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication apparatus comprising:
   image processing means for performing predetermined image processes on biometric trait image data sequentially supplied from image pickup means at predetermined intervals, the predetermined image processes including at least a binarization process;
   detection means for detecting, over time, correlation values between adjoining images of the image data on a time axis and correlation values between adjoining binarized images of binarized image data on a time axis, the binarized image data being generated by the image processing means; and
   selection means for selecting, when a situation in which both the correlation values of the images and the correlation values of the binarized images are respectively less than a first threshold and a second threshold continues over a predetermined period of time, one of the binarized image data input after the continuation of the situation, to be compared with registration data.

2. The authentication apparatus according to claim 1, further comprising:
   deletion means for deleting, when a correlation value between the current and previous images of the image data sequentially supplied from the image pickup means at predetermined intervals becomes greater or equal to a third threshold, the image data of the current image, wherein
   the image processing means performs the predetermined image processes on the remaining image data not deleted by the deletion means.

3. An authentication method comprising:
   a first step of detecting, over time, correlation values between adjoining images of biometric trait image data on a time axis, the image data being sequentially supplied from image pickup means at predetermined intervals;
   a second step of detecting, over time, correlation values between adjoining binarized images of binarized image data on a time axis, the binarized image data being acquired by performing predetermined image processes, including at least a binarization process, on the image data; and
   a third step of selecting, when a situation in which both the correlation values of the images and the correlation values of the binarized images are respectively less than a first threshold and a second threshold continues over a predetermined period of time, one of the binarized image data input after the continuation of the situation, to be compared with registration data.

4. A non-transitory computer-readable medium on which is stored a set of instructions for causing a control section that controls image pickup means and image processing means to execute:

a first process of detecting, over time, correlation values between adjoining images of biometric trait image data on a time axis, the image data being sequentially supplied from the image pickup means at predetermined intervals;

a second process of detecting, over time, correlation values between adjoining binarized images of binarized image data on a time axis, the binarized image data being acquired by the image processing means performing predetermined image processes, including at least a binarization process, on the image data; and a third process of selecting, when a situation in which both the correlation values of the images and the correlation values of the binarized images are respectively less than a first threshold and a second threshold continues over a predetermined period of time, one of the binarized image data input after the continuation of the situation, to be compared with registration data.

5. An authentication apparatus comprising:

an image processing section that performs predetermined image processes on biometric trait image data sequentially supplied from an image pickup section at predetermined intervals, the predetermined image processes including at least a binarization process;

a detection section that detects, over time, correlation values between adjoining images of the image data on a time axis and correlation values between adjoining binarized images of binarized image data on a time axis, the binarized image data being generated by the image processing section; and a selection section that selects, when a situation in which both the correlation values of the images and the correlation values of the binarized images are respectively less than a first threshold and a second threshold continues over a predetermined period of time, one of the binarized image data input after the continuation of the situation, to be compared with registration data.

* * * * *